United States Patent [19]

Elrod

[11] 4,263,375

[45] Apr. 21, 1981

[54] SUPERPLASTICALLY FORMED TITANIUM STRUCTURE

[75] Inventor: Samuel D. Elrod, Renton, Wash.

[73] Assignee: The Boeing Company, Seattle, Wash.

[21] Appl. No.: 973,324

[22] Filed: Dec. 26, 1978

[51] Int. Cl.³ .............................................. B32B 15/00
[52] U.S. Cl. ............................... 428/594; 228/173 A;
  228/173 B; 228/173 C; 228/193; 428/660;
  428/940; 428/941
[58] Field of Search ............... 428/594, 660, 940, 941;
  228/173 R, 173 A, 173 B, 173 C, 193

[56] References Cited

U.S. PATENT DOCUMENTS

| | | | |
|---|---|---|---|
| 3,340,028 | 9/1967 | Vordahl | 428/660 |
| 3,645,803 | 2/1972 | Huber et al. | 428/660 X |
| 3,657,801 | 4/1972 | Hershenson | 228/193 X |
| 3,798,011 | 3/1974 | Sharp | 428/940 X |
| 3,802,939 | 4/1974 | Ohtani et al. | 428/660 X |
| 3,920,175 | 11/1975 | Hamilton et al. | 228/173 A |
| 3,996,019 | 12/1976 | Cogan | 428/941 X |
| 4,043,498 | 8/1977 | Conn | 228/193 X |
| 4,071,183 | 1/1978 | Cogan | 228/173 A |
| 4,117,970 | 10/1978 | Hamilton et al. | 228/173 A |

Primary Examiner—L. Dewayne Rutledge
Assistant Examiner—W. G. Saba
Attorney, Agent, or Firm—Morris A. Case; Bernard A. Donahue

[57] ABSTRACT

An article of manufacture of a titanium reinforcing part having a grain structure to impart dimensional stability to the part at elevated temperatures is integrally joined to a titanium sheet having a grain structure to become superplastic at elevated temperatures. The completed composite titanium part is formed with the titanium sheet superplastically forming to intimately contact and to become diffusion bonded to the dimensionally stable titanium part.

1 Claim, 12 Drawing Figures

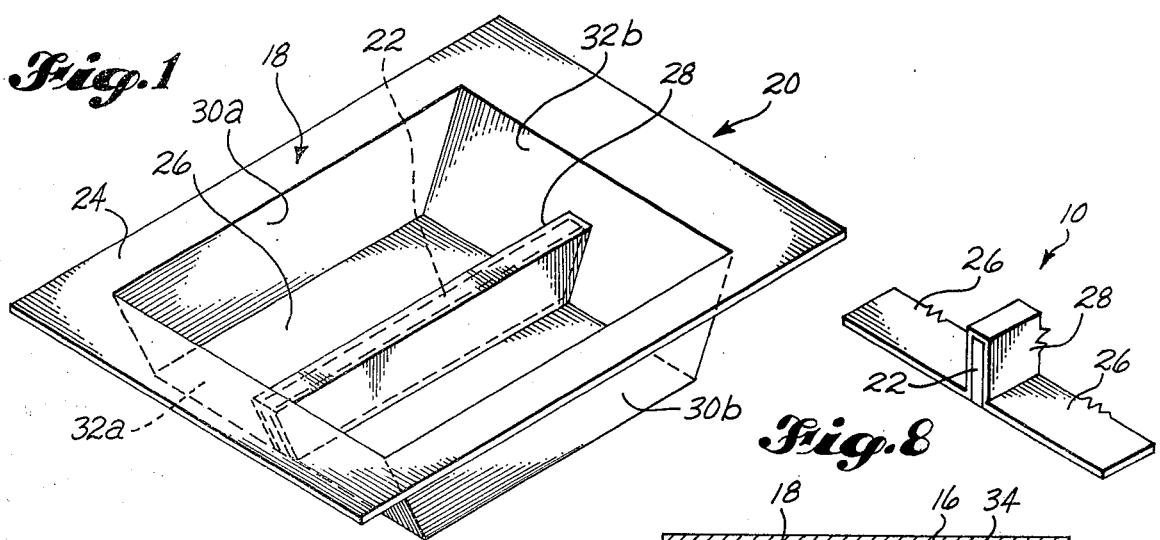
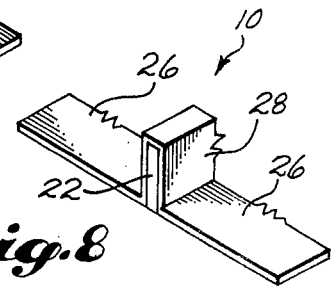
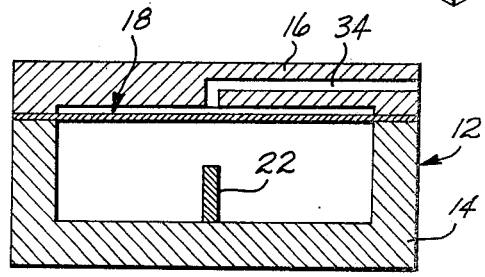
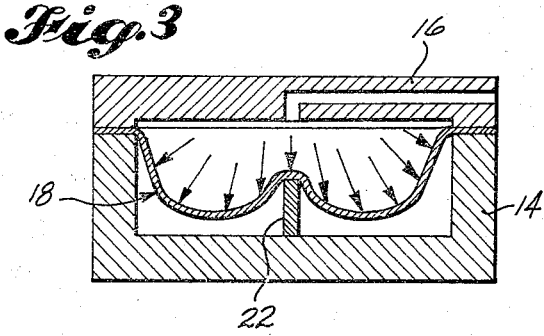
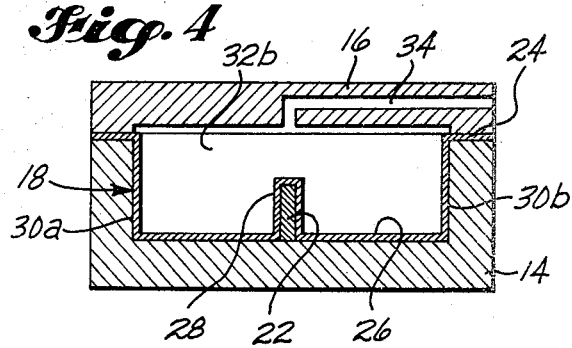
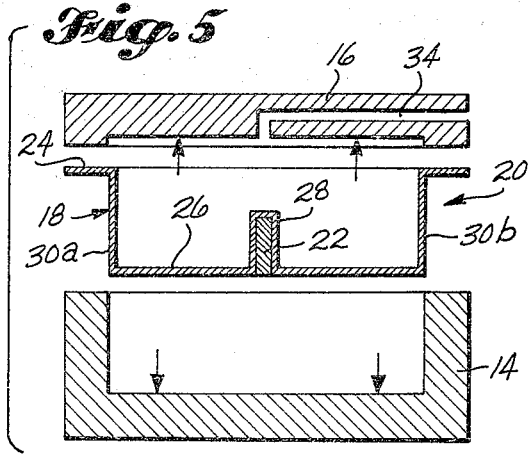
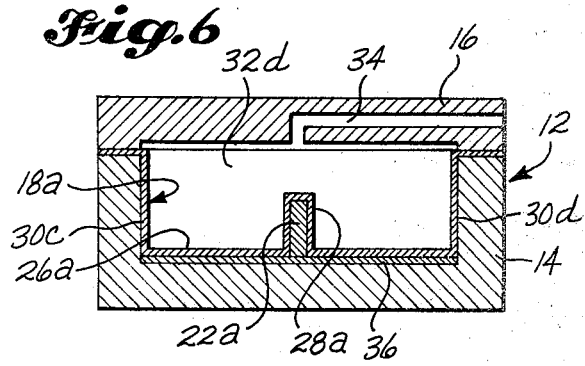
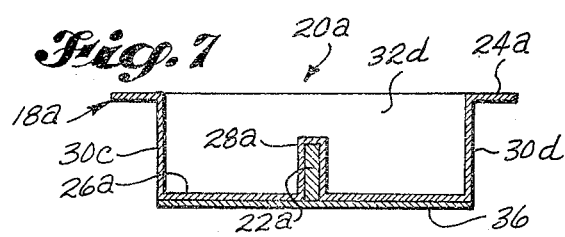

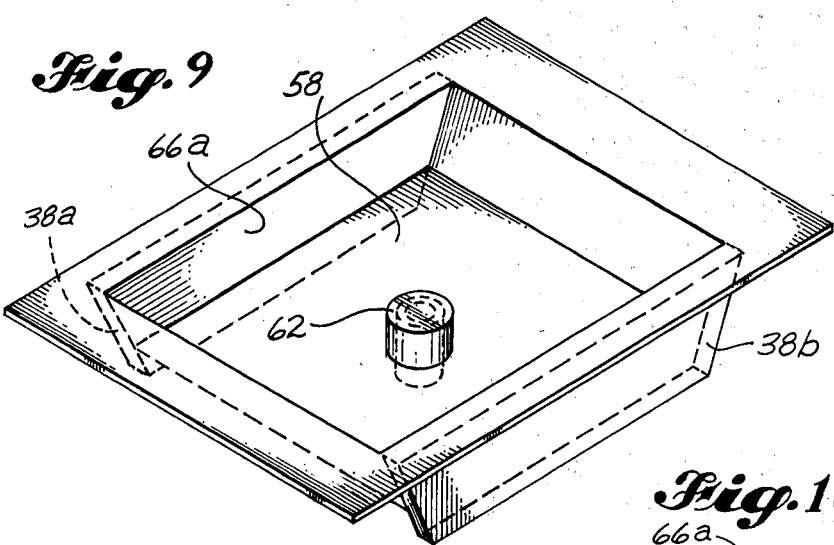
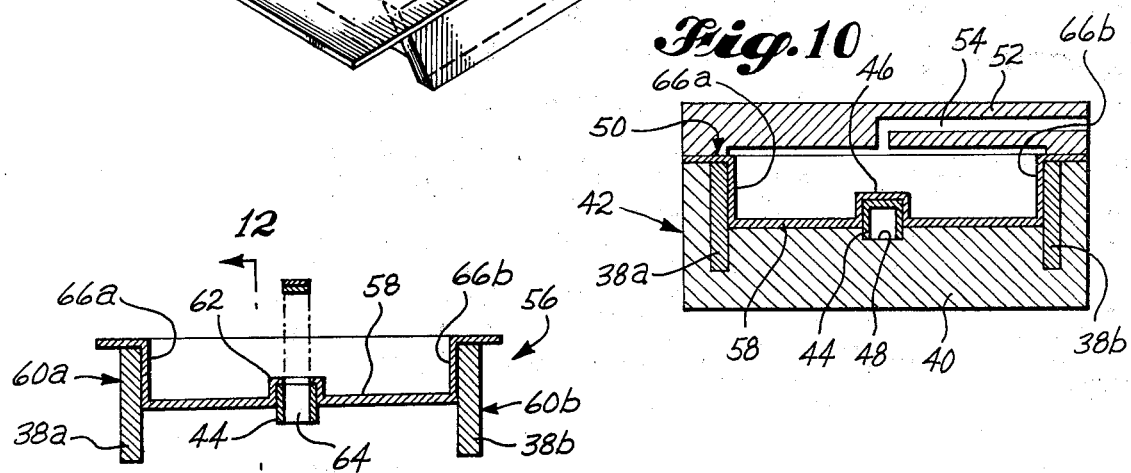
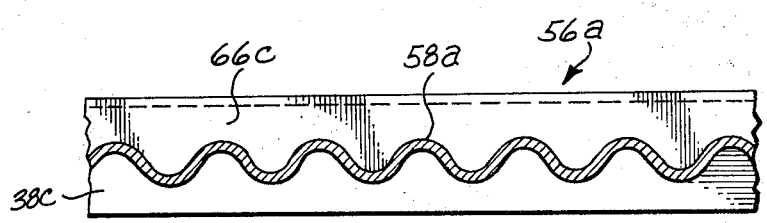

SUPERPLASTICALLY FORMED TITANIUM STRUCTURE

BACKGROUND OF THE INVENTION

It is known that various metals may be superplastically formed, into various shapes, under elevated temperatures while under pressure. It is also known that various metals may be diffusion bonded together under elevated temperatures while under pressure. In U.S. Pat. No. 3,920,175 to Hamilton et al, these two processes were combined to superplastically form and to diffusion bond all in the same process. U.S. Pat. Nos. 3,996,019 and 4,071,183 to Cogan call for a method of using two superplastically formed sheets with reinforcing inserts retained between the sheets by diffusion bonding to generate a part requiring a minimum of post forming machining.

When superplastic forming in combination with diffusion bonding one uses at least one part that is in the form of a sheet that is deformed under superplastic conditions to define a complex shape. This formed sheet is pressed aginst one or more parts, which may be considered as reinforcing parts, to which the sheet is to be joined. Difficulties are often experienced due to the plastic characteristics of the reinforcing part at the conditions required for the process. Even when the reinforcing part is located around the inside surface of a mold in which the process is taking place, thereby allowing the superplastic sheet to press against and force the reinforcing part against the side of the mold, difficulties are experienced with maintaining tolerance due to flow of the reinforcing part. This is corrected to some extent by utilizing a reinforcing part that is much thicker than the sheet. When the reinforcing part is located in the mold such that the reinforcing art is unsupported on two opposite sides the flow of that part is even more of a problem. To help correct this situation it is necessary to use a large cross sectional area. When one uses a thin reinforcing part that is unsupported on two opposite sides a completely unsatisfactory part is generated as the reinforcing part tends to tip sideways. It was found that titanium parts may be superplastically formed and diffusion bonded while maintaining dimensional tolerances.

SUMMARY OF THE INVENTION

A composite titanium structure is fabricated of a titanium sheet having a grain structure to permit the sheet to be superplastically formed by pressure at elevated temperatures and reinforcing titanium parts having a grain structure to maintain dimensional stability at the same pressures and elevated temperatures. The parts are superplastically formed together and are diffusion bonded to form a composite titanium structure.

BRIEF DESCRIPTION OF THE DRAWINGS

FIG. 1 shows a perspective view of a titanium part of this invention as the part appears when removed from a forming mold.

FIGS. 2 through 5 show a side elevational sectional view of the various steps of forming the part of FIG. 1.

FIGS. 6 and 7 show a side elevational sectional view of a different embodiment of the part of FIG. 1.

FIG. 8 shows a fragmented perspective view of the part of FIG. 1 with the part trimmed for use.

FIG. 9 shows a perspective view of a different embodiment of a titanium part of this invention as the part appears when removed from a mold.

FIG. 10 shows a side elevational sectional view of the part of FIG. 9 while still in the mold.

FIG. 11 shows the part of FIG. 10 removed from the mold and trimmed for use.

FIG. 12 shows a different embodiment taken along line 12—12 of FIG. 11.

DETAILED DESCRIPTION

A composite titanium part 10 is formed and bonded in a mold 12 made up of a female mold part 14 and a mold cover 16. The mold parts are formed and shaped to hold a sheet of titanium 18 in a manner to provide a pressure seal between the titanium sheet and the two parts of the mold. The finished part 10, when it is taken from the mold, is as shown in FIG. 1, which indicates the part before it has been trimmed to the final configuration. In that FIGURE the untrimmed part 20 is made up of titanium insert 22, and the titanium sheet 18 in the formed condition. In that condition the border 24, which was held between the two parts of the mold, remains undeformed while the balance of the sheet is formed with bottom portion 26, U-shaped portion 28 contacting and joined to three sides of the insert 22, side members 30a and 30b, and end members 32a and 32b. When trimmed for use the titanium part 10 is made up of a flat sheet 26 with integral U-shaped portion 28 that encircles and is bonded to insert 22 to make up an integral titanium sheet with reinforcement.

In forming the composite titanium member 10, the titanium insert 22, which in this instance is of 6Al 4V titanium alloy, is first placed in an inert atmosphere and the temperature raised to about 1900° F. and held at that temperature for about 30 minutes to beta anneal and thereby form a Widmanstatten grain structure in the part. This is a grain structure that imparts dimensional stability to the part at elevated temperatures. It is not intended to limit this invention to the use of 6Al 4V titanium as other titanium alloys may also be beta annealed and used in this process. The insert is positioned in female mold 14 with that insert located well away from the sides of the mold and held in position by the ends of the insert contacting the tapered ends of the mold. The insert is narrow in width and has a large heighth to width ratio as positioned in the mold. Next a sheet of titanium 18 is positioned between and sealing secured to the two parts 14 and 16 of the mold. A mill annealed titanium alloy is used for the titanium sheet, which gives a fine grain equiaxed structure that becomes superplastic at elevated temperatures. A 6Al 4V titanium is preferred. The mold with parts is heated to a range of about 1450° F. to about 1850° F. with a temperature of about 1650° preferred when using the 6Al 4V titanium alloy. An inert gas under pressure is introduced through channel 34 in mold cover 16. The titanium sheet 18 is superplastic at that temperature and moves down as shown progressively by FIGS. 3 and 4 to intimately contact and surround the insert on three sides, and to fill the female portion of the mold. Pressures of from 50 to 400 p.s.i. are used with about 300 p.s.i. preferred. While still under pressure the mold with parts is raised to about 1700° F. and held at that temperature for a time sufficient to diffusion bond the titanium sheet to the titanium insert which is preferably about 3 hours. The superplastically formed diffusion bonded untrimmed part 20 is removed from the mold and trimmed to the finished titanium structural part 10.

FIGS. 6 and 7 show a different embodiment of this invention wherein a sheet of titanium 36, which is preferably mill annealed to become superplastic at elevated temperatures is placed in the bottom of the mold, beta annealed part 22a located in the mold, mill annealed sheet 18a superplastically formed into shape having unformed parts 24a, sides 30c and 30d, end members 32c and 32d, bottom portion 26a and, U-shaped portion 28a. These parts are superplastically formed and diffusion bonded together into an integral titanium untrimmed part 20a, which is trimmed for use.

FIGS. 9 through 11 show another embodiment of this invention. A pair of structural members 38a and 38b are spaced apart by placement along the sides of female mold part 40 of mold 42. These structural members are of a beta annealed titanium alloy that has a grain structure to provide dimensional stability to those members at elevated temperatures. A thin walled, hollow insert 44 with end cap 46 is located in a recess 48 of the female mold part. This insert is of a titanium alloy also having a grain structure to be dimensionally stable at elevated temperatures. A sheet 50 of mill annealed titanium alloy is sealingly located between female mold part 40 and mold cover part 52. The mold with parts is raised to superplastic forming temperatures, inert gas under pressure introduced through channel 54 and sheet 50 deforms to intimately contact and to diffusion bond to the structural members and to the insert. After the deforming and the bonding is completed, parts of the titanium sheet are trimmed away to provide a beam 56 having a web 58, and a pair of flanges 60a and 60b. Located in the web is a reinforcement made up of the insert 44 and a portion 62 of the deformed sheet 50 that is integrally joined to the insert. The reinforcement has an opening 64 extending through the web as part of the end cap 46 and part of the portion 62 of the sheet is drilled through to provide the opening. The flanges are made up respectively of reinforcing part 38a and a portion 66a of the sheet 50 and of part 38b and a portion 66b of the sheet 50. All of the balance of the sheet 50 is trimmed away to leave the finished beam. It is not intended to be limited to beams as other shapes such as, but not limited to, channels can also be formed by this process.

FIG. 12 shows another embodiment of this invention with a beam 56a having a flange 60c made up of a dimensionally stable titanium structural member 38c diffusion bonded to a sheet 66c with said sheet integral to a web portion 58a that is sine wave in shape.

I claim:

1. An article of manufacture superplastically formed and diffusion bonded comprising: a pair of spaced apart titanium parts having a Widmanstatten grain structure to render the parts dimensionally stable at superplastic forming conditions; a thin walled hollow insert with end cap, located intermediate the spaced apart titanium parts, and the insert having a Widmanstatten grain structure to render the insert dimensionally stable at superplastic forming conditions; a third titanium part superplastically formed and diffusion bonded to facing sides of the pair of parts to form a pair of flanges, and the third part extends between the flanges to form a web superplastically formed and diffusion bonded to the insert end cap and side, and the cap of the insert with diffusion bonded superplastically formed part having a hole extending through to provide a reinforced opening through the superplastically formed web.

* * * * *